(12) United States Patent
VIgliotti

(10) Patent No.: US 11,166,573 B1
(45) Date of Patent: Nov. 9, 2021

(54) DEVICE FOR MOUNTING DECORATIONS

(71) Applicant: Anthony F. VIgliotti, Waxhaw, NC (US)

(72) Inventor: Anthony F. VIgliotti, Waxhaw, NC (US)

( * ) Notice: Subject to any disclaimer, the term of this patent is extended or adjusted under 35 U.S.C. 154(b) by 0 days.

(21) Appl. No.: 17/247,828

(22) Filed: Dec. 24, 2020

(51) Int. Cl.
*A47G 1/16* (2006.01)

(52) U.S. Cl.
CPC .................. *A47G 1/1613* (2013.01)

(58) Field of Classification Search
CPC ........ A47G 1/1613; A47G 33/00; A01G 5/04; F16M 13/00; F16M 13/02
USPC .......................................... 248/302
See application file for complete search history.

(56) References Cited

U.S. PATENT DOCUMENTS

| | | | |
|---|---|---|---|
| 1,611,003 A | 12/1926 | Dearwester | |
| 3,511,461 A * | 5/1970 | Clark | E04H 13/001 248/27.8 |
| 4,590,704 A * | 5/1986 | Volk | A01M 23/18 43/60 |
| 5,235,780 A | 8/1993 | Colbert | |
| 5,379,783 A | 1/1995 | Healzer et al. | |
| 5,645,254 A | 7/1997 | Ng et al. | |
| 6,032,915 A * | 3/2000 | Brindisi | A47G 1/1613 248/466 |
| 6,095,479 A * | 8/2000 | Brindisi | A47G 1/1613 248/476 |
| 6,688,040 B1 | 2/2004 | Yang | |
| 7,305,794 B1 | 12/2007 | Cantrell | |
| 8,276,300 B2 | 10/2012 | Huang | |
| 8,777,023 B2 | 7/2014 | Hendricks et al. | |
| 2006/0162215 A1 | 7/2006 | McVay | |

FOREIGN PATENT DOCUMENTS

| | | | |
|---|---|---|---|
| CN | 2738567 Y * | 11/2005 | |
| FR | 2934763 A1 * | 2/2010 | ........... A47G 1/1613 |

* cited by examiner

*Primary Examiner* — Eret C McNichols
*Assistant Examiner* — Ding Y Tan
(74) *Attorney, Agent, or Firm* — Memminger E. Wiggins

(57) ABSTRACT

The present invention provides a device for mounting a length of decoration to wall décor of various sizes and shapes such a framed or unframed artwork, mirrors, and the like. The device is easily mounted to or removed from the top of the wall décor for short-term or long-term decoration. The present invention comprising an upper frame section, a lower frame section contiguous to the upper frame section, and a pair of horizontal mounting members that are extended in opposite directions to match the width of the wall décor. The lower frame section engages the horizontal top edge and the vertical backside of the wall décor for mounting stability. The length of decoration is detachably attached to the upper frame section and the pair of horizontal mounting members of the present invention.

20 Claims, 8 Drawing Sheets

DEVICE FOR MOUNTING DECORATIONS

CROSS-REFERENCE TO RELATED APPLICATIONS

Not Applicable.

STATEMENT REGARDING FEDERALLY SPONSORED RESEARCH OR DEVELOPMENT

Not Applicable.

PARTIES TO A JOINT RESEARCH AGREEMENT

Not Applicable.

REFERENCE TO SEQUENCE LISTING, A TABLE, OR A COMPUTER PROGRAM LISTING SUBMITTED ON A COMPACT DISC WITH APPENDIX

Not Applicable.

FIELD OF THE INVENTION

The present invention, a device for mounting decorations, relates to devices for the hanging of holiday or special occasion decor, and more particularly to an innovative device for temporarily mounting decorations to the top of framed or unframed wall art, mirrors, and such other wall décor.

BACKGROUND OF THE INVENTION

Existing methods and mechanisms for mounting decorations to wall décor are sparse and have substantial limitations. The desire to mount decoration to wall décor may be related to a general long-term or short-term decoration need, a special occasion for a person or persons, or a seasonal or holiday occasion.

The present invention is intended to provide a stable base for attaching a length of decoration to the top of wall décor such as framed or unframed wall art, mirrors, and such other wall décor. Typical items that are often used to decorate wall décor include lengths of garland, artificial pine, natural pine and/or other materials to create an ornamental piece that can be quickly and easily mounted atop a framed object such as a picture, painting, or a mirror. Often the top edge of the wall décor to which the desired decoration is to be mounted is too narrow to permit the decoration to simply be "draped" onto the top of the wall décor. In such circumstance the decorator may be forced to result to certain mechanical means to attach and secure the decoration to the top of the wall décor. These mechanical means may include nails, screws, other kinds of metal fasteners, metal hangars of one kind or another, as well as the tools that are required when using such mechanical means. Alternatively, a decorator may use adhesives such as hot or cold glue, tape, or wax to secure the decoration to the wall décor. Unfortunately, the implementation of any of the above means is often not only a difficult task, but also time-consuming task. Additionally, the use of such mechanical or adhesive means cause damage to the wall décor or to the wall itself. And finally, the use of such mechanical or adhesive means to attach a length of decoration to wall décor may create a situation where the decoration is difficult remove once the need or occasion for the decoration has ended.

Accordingly, there remains room for improvement and variation within the art and a need for a simple and effective device for mounting a length of decoration to a wall décor.

SUMMARY OF THE INVENTION

The present invention is directed to a device for the simple detachable attachment of a length of decoration to a vertically mounted wall décor without the need of any special tools and regardless of the means by which a wall décor is affixed to a wall. The simple design and configuration of the present invention allows it to be used for the detachable attachment of a variety of decorations on wall décor of various shapes and sizes. In a preferred embodiment the decoration may be detachable attached to the present invention by an individual homeowner or a decorator to produce a custom decorating item. In another preferred embodiment the decoration may be pre-attached to the present invention and sold by a retail seller as a complete article of decoration for mounting onto wall décor by a homeowner or a decorator. Therefore, one aspect of the present invention is to provide a simple device for the detachable attachment of a variety of kinds of decoration to vertically mounted wall décor of various sizes and shapes.

It is at least one aspect of the present embodiments of the present invention to provide device for detachably attaching a length of decoration to a vertically mounted wall décor wherein said invention comprising an upper frame section, a lower frame section that is contiguous to the upper frame section, first and second horizontal mounting members, and a pair of parallel eyelets attached to the front side of the upper frame section designed to slidably engage the first and second horizontal mounting members and to limit the distance which the horizontal mounting members may extend.

It is a further aspect of at least one of the present embodiments to provide an upper frame section that extends vertically a distance above the wall décor and is designed and adapted for the detachable attachment of the length of decoration to an upper frame section having a front side and a back side and being generally coplanar to the wall décor, wherein the wall décor having a generally horizontal top edge, a vertical front side, a vertical back side, and a width.

Another aspect of at least one of the present embodiments is to provide an upper frame section comprising a first upward extending member having a first end and an inward perpendicular second end, a second upward extending member having a first end and an inward perpendicular second end, and a top end defined by the inward perpendicular second end of the first upward extending member and the inward perpendicular second end of the second upward extending member.

It is still a further aspect of at least one of the present embodiments to provide a lower frame section having left and right vertical members designed and adapted to engage the horizontal top edge of the wall décor to support the present invention and to extend a distance below the horizontal top edge adjacent to the vertical back side of the wall décor for stabilizing the present invention during its use.

Another aspect of at least one of the present embodiments is to provide a left vertical member of the lower frame section having a left lateral support and first and second perpendicular supports to engage the horizontal top edge of the wall décor to support the present invention and a left anchor that extends downward a distance below the horizontal top edge of the wall décor and adjacent to the vertical back side of the of the wall décor to stabilize the present invention upon its placement onto the horizontal top edge of the wall décor.

Another aspect of at least one of the present embodiments is to provide a right vertical member of the lower frame section that is designed and configured to be a mirror image of the of the left vertical support of the lower frame section and also having a right lateral support and first and second perpendicular supports to engage the horizontal top edge of the wall décor to support the present invention and a right anchor which extends downward a distance below the horizontal top edge of the wall décor and adjacent to the vertical back side of the of the wall décor to stabilize the present invention upon its placement onto the horizontal top edge of the wall décor.

It is a further aspect of at least one of the present embodiments to provide first and second horizontal mounting members of equal lengths each having first and second angled stop ends that are designed and adapted to slidably engage the pair of parallel eyelets attached to the upper frame section, wherein the first and second horizontal mounting members are extended a distance in opposite directions parallel to the horizontal top edge of the wall décor for detachable attachment of a length of decoration.

Another aspect of at least one of the present embodiments is to provide first and second parallel eyelets through which the first and second horizontal mounting members slidably extend being designed and adapted to engage the angled stop ends of the first and second horizontal mounting members, the parallel eyelets being attached to the front side of the upper frame section at the first ends of the first and second upward extending members.

It is a further aspect of at least one of the present embodiments to provide a device that will not damage wall décor or walls when detachably attaching a length of decoration to the device.

Another aspect of at least one of the present embodiments provides a device that allows for easy removal of a length of decoration from the wall décor to which such decoration may be detachably attached.

It is still a further aspect of at least one of the present embodiments to provide a device that can easily be mounted and removed from wall décor on which prefabricate decoration is affixed.

Another aspect of at least one of the present embodiments of the present invention is to provide a device that can easily be mounted and removed from wall décor without interfering with the customary means by which a wall décor is typically affixed to a wall.

These and other features, aspects, and advantages of the present invention will become better understood with regard to the following description, appended claims, and accompanying drawings.

DETAILED DESCRIPTION OF THE INVENTION

Figure 1:
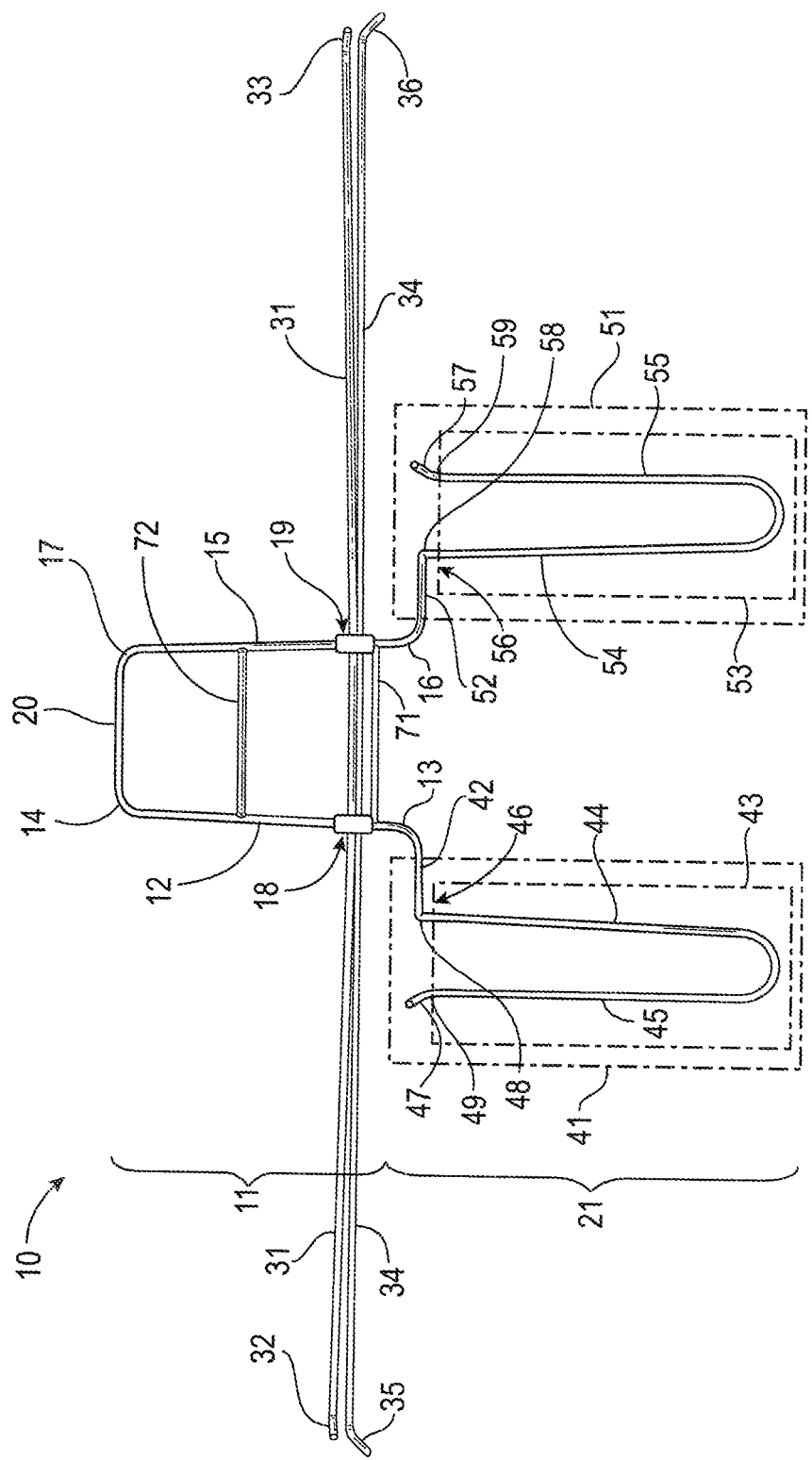
FIG. 1 is a front plan view of a preferred embodiment for the present invention.
Figure 2:
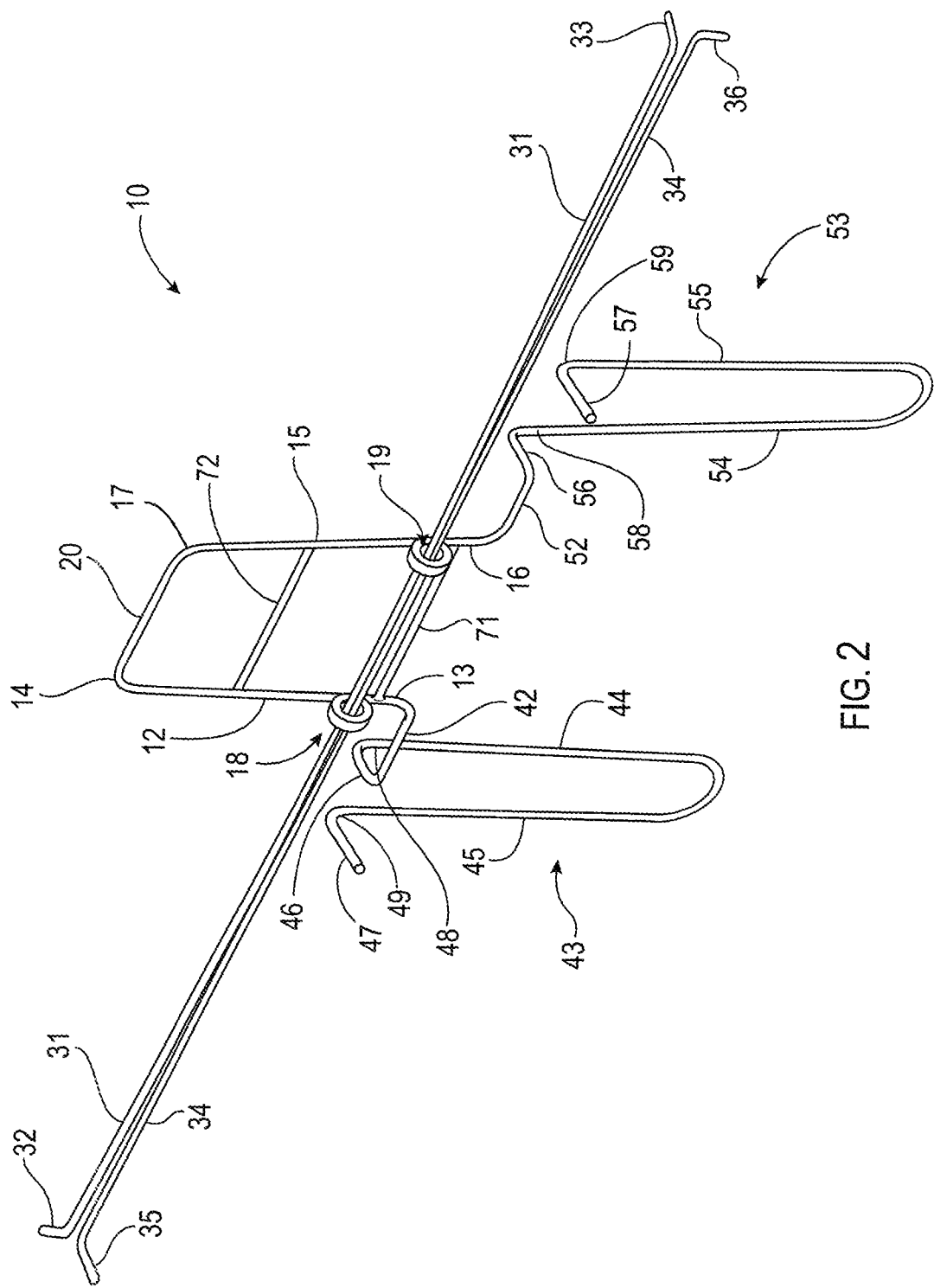
FIG. 2 is a front perspective view of a preferred embodiment for the present invention.
Figure 3:
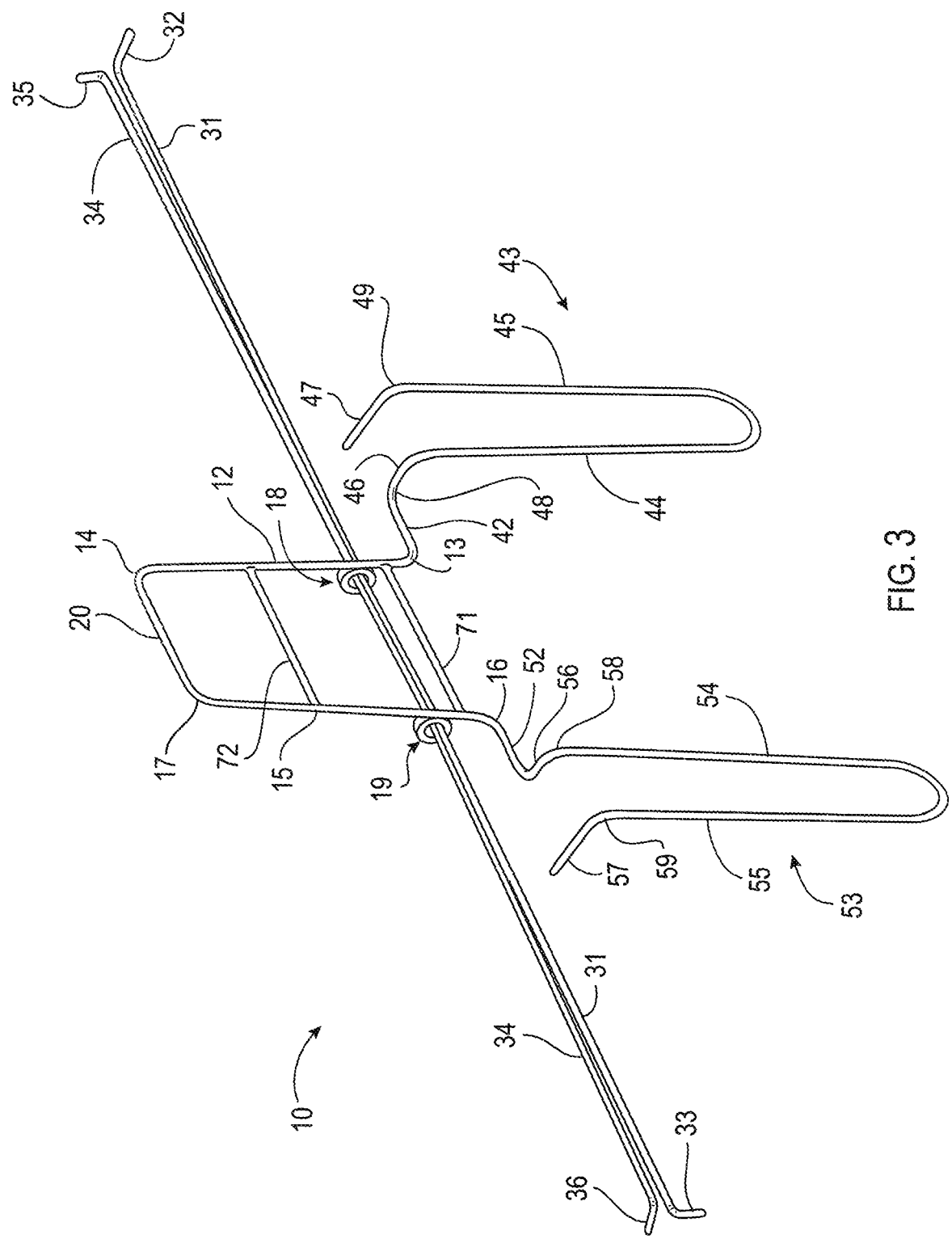
FIG. 3 is a rear perspective view illustrating the back side of a preferred embodiment for the present invention.
Figure 4A:
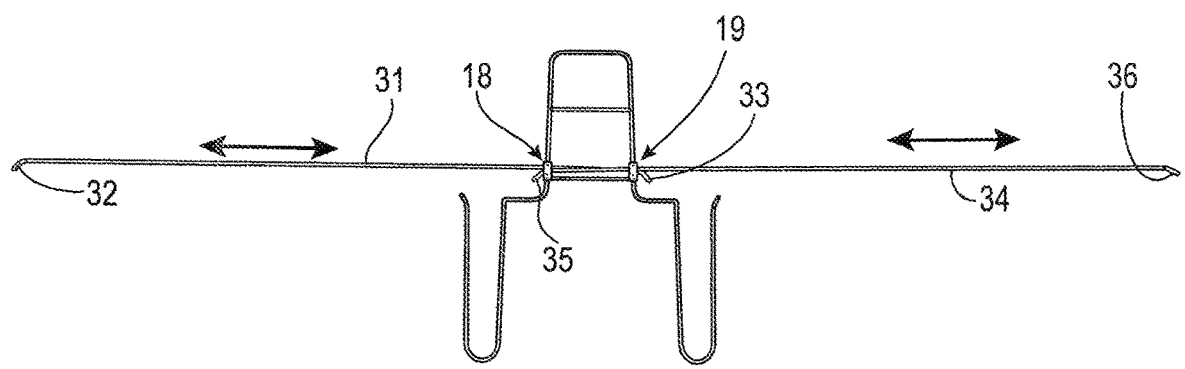
FIG. 4A is a front plan view of the present invention illustrating horizontal mounting members in their extended configuration.
Figure 4B:
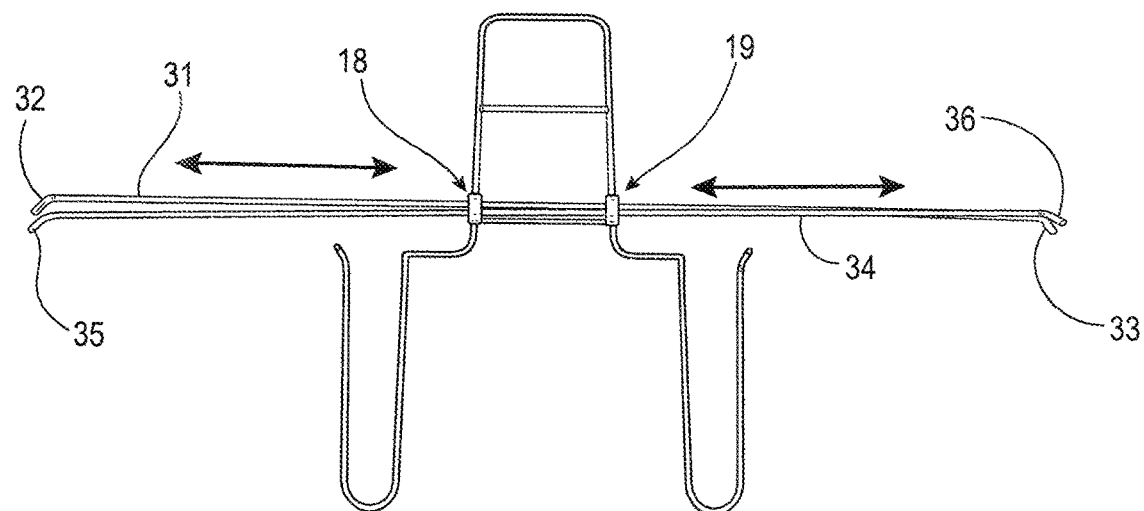
FIG. 4B is a front plan view of the present invention illustrating horizontal mounting members in their unextending configuration.
Figure 5:
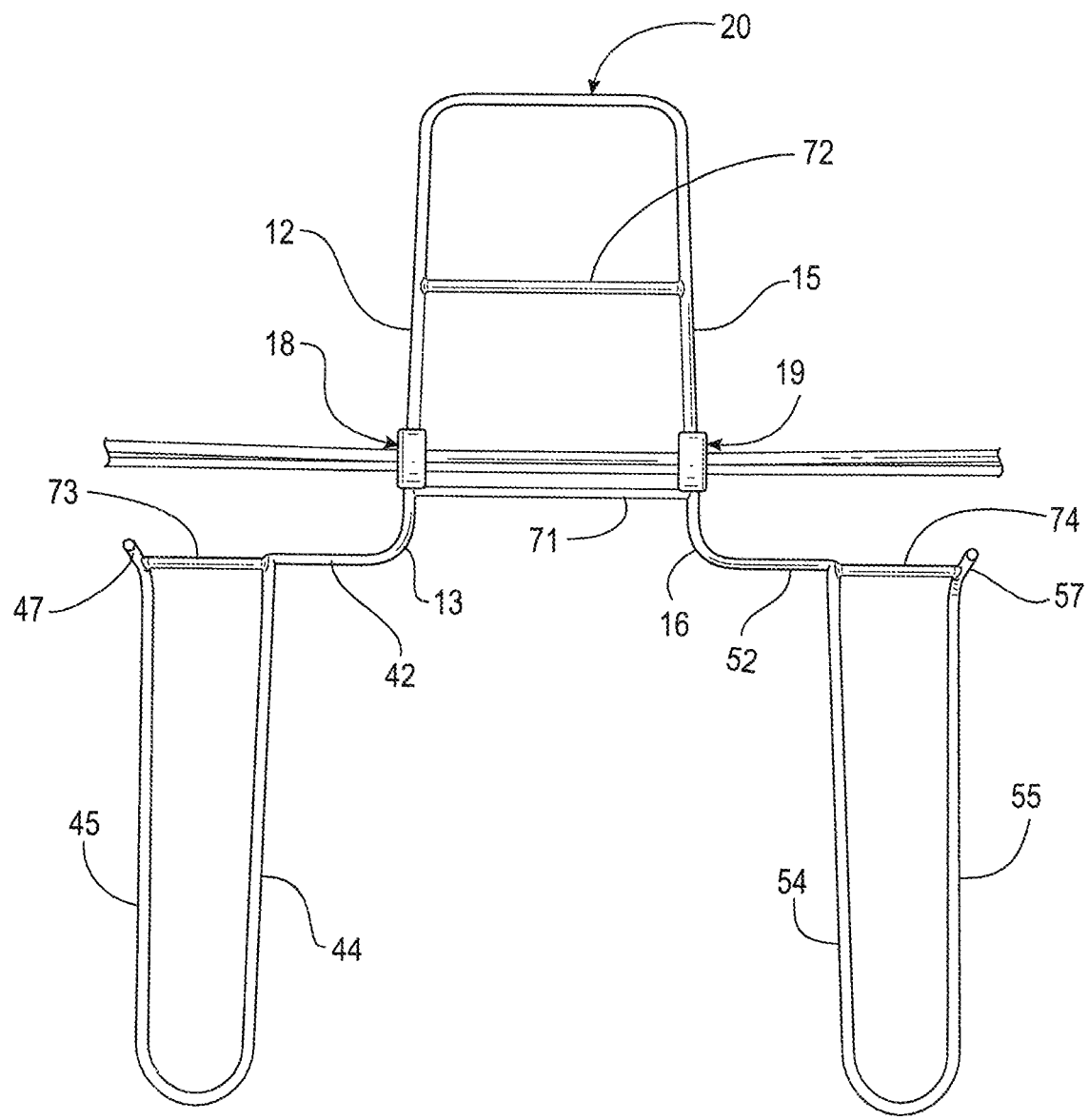
FIG. 5 is a front plan view illustrating placement of additional support brace members for the present invention.
Figure 6:
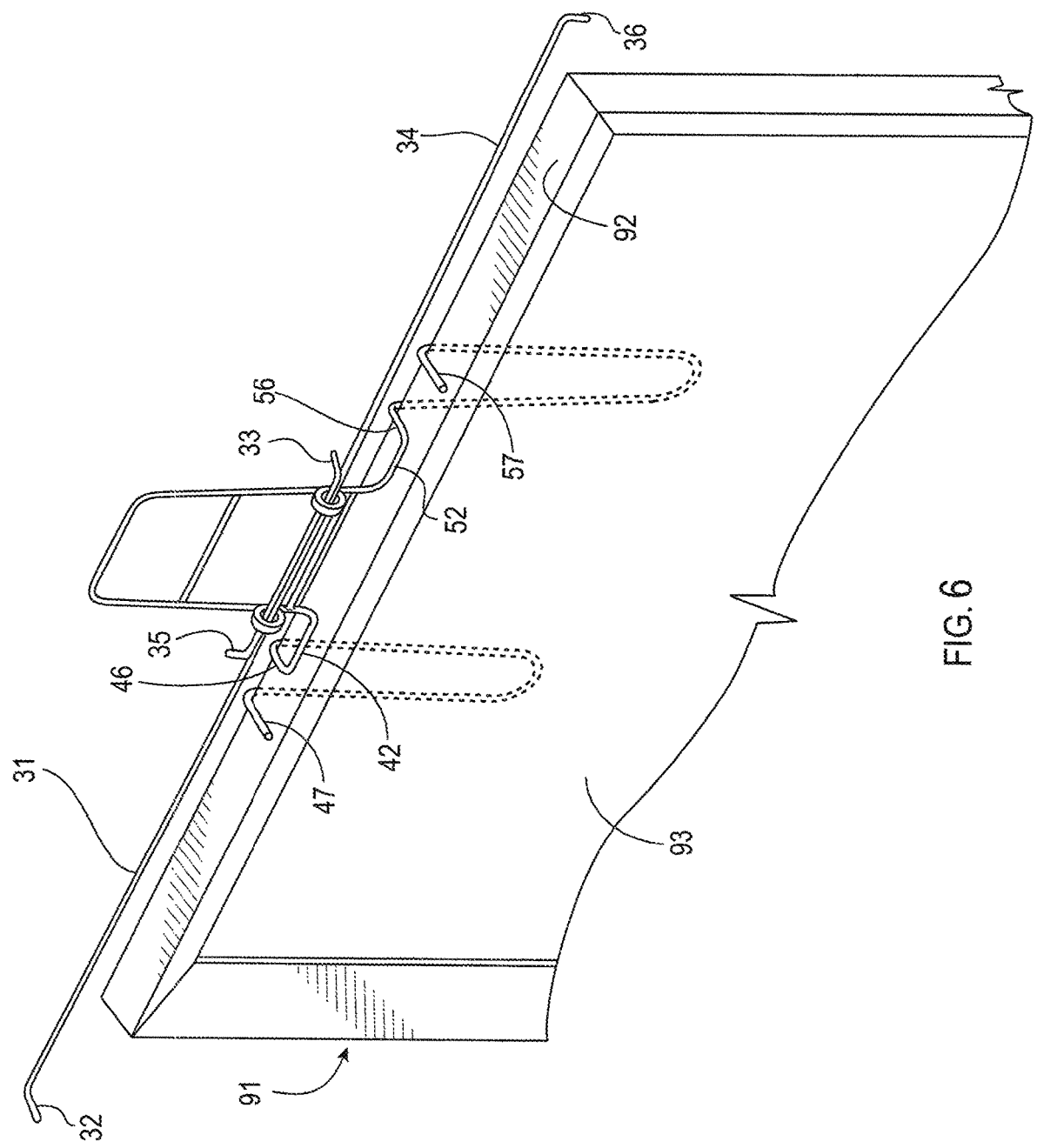
FIG. 6 is a front perspective view of a preferred embodiment of the present invention mounted on a picture frame.

Prior to referring to the drawings, definitions and explanations are offered to assist the reader in understanding this description.

The singular forms "a", "an" and "the" are intended to include the plural forms as well, unless the context clearly indicates otherwise. It will be further understood that the terms "having", "including", "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

S In the description of exemplary embodiments, relative terms such as "angled", "upper", "lower", "upward", "downward", "forward", "rearward", "inward". "outward", "left", "leftward", "right", "rightward", "middle", "midway", "contiguous", "parallel", "coplanar", "horizontal", "vertical", "lateral", "above", "below", "up", "down", "top", "bottom", "front", and "back" as well as derivatives thereof (e.g., "horizontally", "downwardly", "upwardly", "inwardly", "outwardly", "vertically", "perpendicularly") should be construed to refer to the orientation as then described or as shown in the drawing under the discussion.

The term "forward" when referenced with regard to a directional orientation means away from the wall to which a wall décor is mounted.

The term "rearward" when referenced with regard to a directional orientation means towards or facing the wall to which a wall décor is mounted.

The terms "left" or "right" when referenced with regard to the identification of an invention component is determined as viewed by an observer facing the front side of the upper frame section of the present invention.

In describing specific components or elements of the present invention when such component or element is referred to herein as being attached, contiguous, connected, coupled, or fastened to another component or element it can be directly attached, contiguous, connected, coupled, or fastened to the to the other component or element or intervening elements that may be present. In contrast, when a component or element is referred to herein as being directly attached, contiguous, connected, coupled, or fastened to another component or element, there are no intervening components or elements present. Moreover, although the drawings illustrate connection of some components or elements by means of welding, any other connecting, fastening, or bonding means may be used provided such means does not interfere with the operation or structural integrity of the device.

Reference will now be made in detail to one exemplary embodiment of the present invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the intended invention. Other objects, features, and aspects of the present invention are disclosed in the following detailed description. It is to be understood by one of ordinary skill in the art that the present discussion is a description of one exemplary embodiment only and is not intended as limiting the broader aspects of the present invention.

In describing the various figures herein, the same reference numbers are used throughout to describe the same apparatus, component, element, or process pathway as applicable. To avoid redundancy, detailed descriptions of much of the apparatus once described in relation to a figure is not necessarily repeated in the descriptions of subsequent figures, although such apparatus or component or process is labeled with the same reference numbers.

A device for mounting a length of decoration to a wall décor according to a preferred embodiment of the present inventions is illustrated in FIGS. 1 to 8. One exemplary embodiment of the present invention 10 can be generally described as a vertical wire framework for mounting a length of decoration 90 to various kinds of vertically mounted wall décor 91, such as but not limited to, framed or unframed artwork and mirrors, comprising an upper frame section 11, a lower frame section 21, first and second horizontal mounting members 31, 34 and first and second parallel eyelets 18, 19. The upper and lower frame sections are maintained in a vertical configuration such that the back side of the device 10 abuts the wall to which the wall décor 91 is mounted and the front side of the device faces away from the wall to which the wall décor is mounted. The first and second horizontal mounting members 31, 34 are maintained in a horizontal configuration relative to the vertical orientation of the upper and lower frame sections 11, 21. The upper frame section 11 being generally coplanar to the wall décor upon which it is placed during use with the lower frame section 21 being in a parallel plane to that of the wall décor. The size and scale of alternate preferred embodiments of the present invention may be varied as necessary to address the type, kind, and size of the decoration used to decorate various types and sizes of wall décor. In one preferred embodiment of the present invention ⅛ inch steel round bar is used for its manufacture. In other preferred embodiments the present invention may utilize steel round bar of greater or lesser diameters depending on the overall dimensions of the present invention with respect to the size and shape of the wall décor on which it may be used. Other embodiments of the present invention may be manufactured from plastic materials of sufficient rigidity and strength as necessary to support the length of decoration detachably attached to the present invention. Still other embodiments of the present invention made be manufactured from a combination of plastic materials and steel round bar or such other suitable metal materials. Additionally, in a preferred embodiment of the present invention the metal wire from which the present invention is manufactured comprises a polymeric coating to prevent possible scratches or other damage to the wall décor or the wall to which the wall décor is mounted. Therefore, as seen in references to FIGS. 1 to 8, in accordance with the present invention a device 10 for detachably mounting a length of decoration 90 to a wall décor 91 is provided herein comprising an upper frame section 11, a lower frame section 21, and first and second horizontal mounting members 31, 34.

Figure 7:
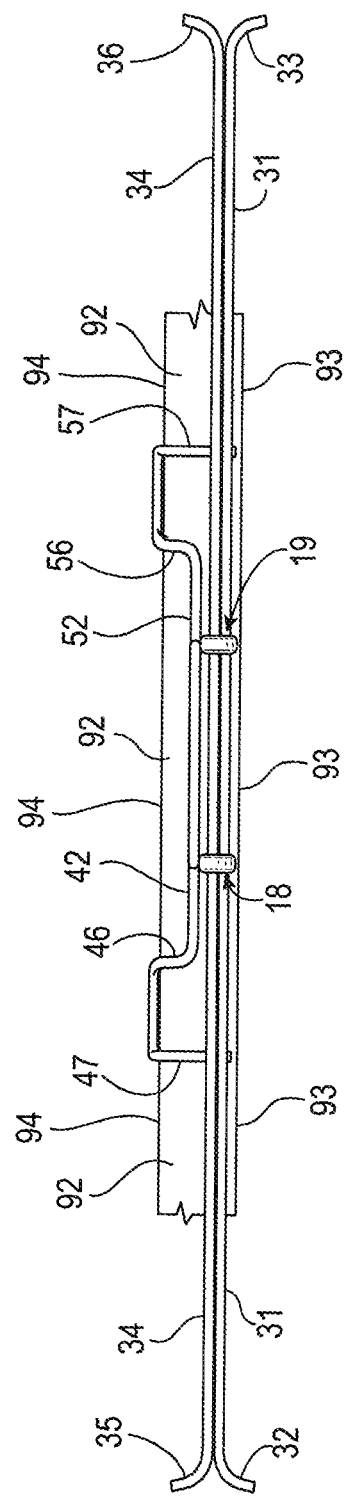
FIG. 7 is a top plan view illustrating the present invention mounted on a wall décor.
Figure 8:
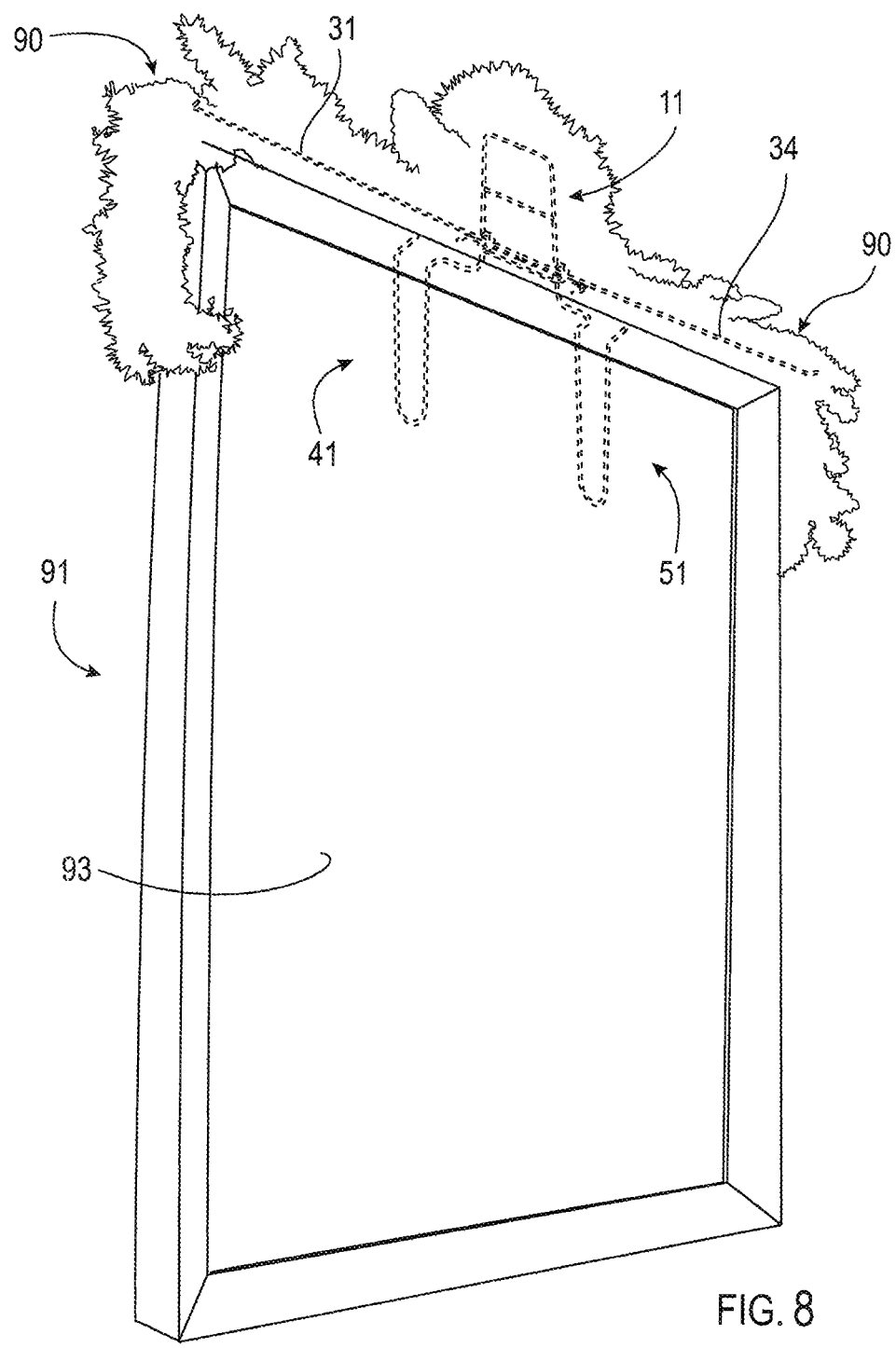
FIG. 8 is front perspective environmental view illustrating the present invention mounted on a picture frame with decoration.

Now referring to FIGS. 1, 7, and 8, the upper frame section 11 of the present invention generally having an inverted flattened "U" shape extends vertically a distance above the wall décor 91 and is designed and adapted for the detachable attachment of a length of decoration 90. The upper frame section 11 having a front side and a back side is generally aligned and coplanar with the wall décor 91. The front side of the upper frame section 11 being that side facing away from the wall to which a wall décor 91 is mounted. The backside of the upper frame section 11 being that side facing the wall to which a wall décor is mounted. In a preferred embodiment the present invention is anticipated for use on wall décor such as framed or unframed artwork, mirrors and such other decorating accessories typically mounted vertically on a wall. Such wall décor 91 having a generally horizontal top edge 92, a vertical front side 93, a vertical back side 94, and a width. Common widths of such wall décor 91 range from about 18 inches to about 27 inches for typical framed or unframed artwork and perhaps most frequently about 24 inches. In one preferred embodiment of the present invention the upper frame section 11 having an inverted "U" shape and extends about 5½ inches above the horizontal top edge 92 of the wall décor 91 to which a preferred embodiment of the present invention is temporarily mounted for use. However, the shape of the upper frame section 11 may be varied (i.e., an "A" shape) in other embodiments of the present invention should such shape be better suited for other kinds and sizes and lengths of decoration 90. The preferred height of the upper frame section 11 is about 5½ inches for one preferred embodiment of the present invention for most types and lengths of decoration, but may range from about 5 inch to about 7 inches for other embodiments of the present invention for other types and lengths of decoration. The preferred width of the upper frame section 11 is about 3 inches, but may range from about 2¾ inches to about 4 inches for other embodiments of the present invention designed and adapted for use with wall décor 91 of greater widths.

Continuing to refer to FIGS. 1, 2, 3, 5, and 8, the upper frame section 11 comprising a first upward extending member 12, a second upward extending member 15 generally parallel to said first upward extending member 12, and first and second horizontal braces 71, 72 that are horizontally connected to the first and second upward extending members 12, 15. The first upward extending member 12 having a first end 13 and an inward perpendicular second end 14 traversing towards the middle of the device 10. The second upward extending member 15 having a first end 16 and an inward perpendicular second end 17 traversing towards the middle of the device 10 and being towards the inward perpendicular second end 14 of the first upward extending member 12. The first and second extending upward members 12, 15 being equal in length with the preferred length being about 5½ inches. However, in other embodiments of the present invention the length of the first and second extending upward members 12, 15 may range from about 5 inches to about 7 inches. The inward perpendicular second end 14 of the first upward extending member 12 and the inward perpendicular second end 17 of the second upward extending member 15 defining a top end 20 of the upper frame section 11.

To provide stability and additional rigidity for structural integrity to the upper section 11 of the present invention first and second horizontal braces 71, 72 are horizontally connected to the first and second upward extending members 12, 15. In a preferred embodiment of the present inventions the first and second ends of the first horizontal brace 71 of the upper frame section 11 are connected about ⅞ inch above the first end 13 of the first upward extending member 12 and ⅞ inches above the first end 16 of the second upward extending member 15, respectively, of the upper frame section. However, in other embodiments of the present invention the first and second ends of the first horizontal brace 71 of the upper frame section 11 may be connected at distance of about ⅝ inches to about 2 inches above the first end 13 of the first upward extending member 12 and about ⅝ inches to about 2 inches above the first end 16 of the second upward extending member 15, respectively, of the upper frame section. The second horizontal brace 72 having its first and second ends connected horizontally respectively to the first and second upward extending members 12, 15 generally midway between said top end 20 of the upper frame section 11 and the first horizontal brace 71 of the upper frame section 11. In one preferred embodiment of the present invention a weld is used to secure the ends of the first and second horizontal braces 71, 72 to the first and second upward extending members 12, 15. Although preferred embodiments of the present invention provide for an upper frame section 11 having a height from about 5 inches to about 7 inches, it is anticipated that the height of the upper frame section may be decreased to a minimum of about 1 inch depending on the overall dimensions of the length of decoration detachably attached to the present invention. In, those embodiments having decreased upper frame section heights, the number of, and/or the need for, horizontal braces for device stability and structural integrity may be reduced or completely eliminated.

Now referring to FIGS. 1, 2, 3, 4A, 4B, 5, and 8, a preferred embodiment of the present invention includes first and second parallel eyelets 18, 19 through which the first and second horizontal members 31, 34 are designed and adapted to slidably extend a distance in opposite directions to generally match the width of the wall décor 91 when detachably attaching a length of decoration 90. In one preferred embodiment of the present invention the parallel eyelets 18, 19 are attached via a weld to the front side of the upper frame section 11 at a distance of about 1 inch above the first ends 13, 16 of the first and second upward extending members 12, 15, of the upper frame section 11. In other embodiments of the present invention the attachment of the parallel islets 18, 19 to the upper frame section 11 may range from about ⅞ inch to about 2 inches above first ends 13, 16 of the first and second upward extending members 12, 15, of the upper frame section 11. In one preferred embodiment of the present invention the islet openings of the first and second parallel eyelets 18, 19 through which the first and second horizontal members 31, 34 extend having a diameter of about ⅜ inches. In other embodiments of the present invention the diameter of the first and second parallel islets 18, 19 is about ⅜ inch to about ⅝ inch. Now referring to FIGS. 1, 2, 3, 5, 6, 7, and 8, the lower frame section 21 in a preferred embodiment of the present invention is contiguous to the upper frame section 11 extending vertically a distance below the horizontal top edge 92 of the wall décor 91 and adjacent to the vertical back side 94 of the wall décor 91. The lower frame section 21 preferably extends about about 5¾ inches below the horizontal top edge 92 of the wall décor 91 in one preferred embodiment of the present invention. However, in other embodiments of the present invention the lower frame section 21 may extend about 5 inches to about 7 inches below the horizontal top edge 92 of the wall décor 91 to accommodate wall décor of varioius sizes as may be necessary to provide increased stability for decorations of greater length and size. The lower frame section 21 is designed and adapted to engage the horizontal top edge 92 and the vertical back side 94 of the wall décor 91 such that the present invention 10 rests upon and is supported by the horizontal top edge 92 of the wall décor 91. In one preferred embodiment of the present invention the lower frame 21 section comprising left and right vertical members 41, 51.

The left vertical member 41 of the lower frame section 21 being contiguous to the first end 13 of the first upward extending member 12 of the upper frame section 11. Referring to FIGS. 1, 2, 3, 5, 6, 7, and 8, the left vertical member 41 having a left lateral support 42, a first perpendicular support 46, a left anchor 43, and a second perpendicular support 47. The left lateral support 42 of the left vertical member is coplanar to, and extends perpendicularly leftward away from, the first end 13 of the first upward extending member 12 of the upper frame section 11. The left lateral support 42 of the left vertical member is designed and adapted to traverse laterally along the horizontal top edge 92 of the wall décor 91 upon which the present invention is placed when detachably attaching a length of decoration 90. The length of the left lateral support 42 of the left vertical member in a preferred embodiment of the present invention is about 1½ inches. However, it is anticipated that such length of the left, lateral support of the left vertical member may range from about 1 inch to about 2 inches for wall décor of greater widths when additional support and stability is desired.

The first perpendicular support 46 of the left vertical member 41 is contiguous and coplanar to the left lateral support 42 of the left vertical member and designed and adapted to engage the horizontal top edge 92 of the wall décor 91. In a preferred embodiment of the present invention the first perpendicular support 46 of the left vertical member 41 extends a distance of about ½ inches perpendicularly rearward from said left lateral support 42 of the left vertical member. Alternative embodiments of the present invention may provide that the first perpendicular support 46 extend a greater distance rearward to properly engage a wall décor 91 having a wider horizontal top edge 92 where such distance may be about ⅜ inches to about ¾ inches.

The left anchor 43 of the left vertical member 41, generally having a "U" shape, extends a distance perpendicularly downward from the first perpendicular support 46 of the left vertical member 41 comprising coplanar first and second downward extending members 44, 45 of approximate equal lengths. The lower ends of the first and second downward extending members defining the "U" shaped lower end of the left anchor 43. In a preferred embodiment of the present invention the lengths of the first and second downward extending members 44, 45 being about 5¾ inches, however in other embodiments of the present invention the lengths of the first and second downward extending members may range from about 5 inches to about 7 inches. The first and second downward extending members 44, 45 have first and second upper ends 48, 49, respectively. The first upper end 48 of the first downward extending member 44 of the left anchor 43 of the left vertical member 41 is contiguous to the first perpendicular support 46 of the left vertical member 41. In a preferred embodiment of the present invention the left anchor 43 of the left vertical member 41 is designed and adapted to rest against the vertical back side 94 of said wall décor 91 and to abut the wall to which the wall décor is attached to provide stability for the present invention when detachably attaching a length of decoration to the wall décor. In a preferred embodiment of the present invention the distance between the first and second downward extending members 44, 45 of the left anchor 43 of the left vertical member 41 is about 1¼ inches. However, the distance between the first and second downward extending members 44, 45 of the left anchor of the left vertical member 41 may be from about 1 inch to about 2 inches for other preferred embodiments of the present invention. To provide additional stability and rigidity for structural integrity to the lower section 21 of the present invention 10 an additional preferred embodiment may provide a left horizontal brace 73 horizontally connected to the first and second upper ends 48, 49 of the first and second downward extending members 44, 45 of the left anchor 43 of the left vertical member 41. The length of the left horizontal brace 73 being equal to the distance between the first and second downward extending members 44, 45 of the left anchor 43 of the left vertical member 41.

The second perpendicular support 47 of the left vertical member 41 is contiguous to and extends a distance of about 1⅛ inch perpendicularly forward from the second upper end 49 of the second downward extending member 45 of the left anchor 43 of the left vertical member 41. Alternative embodiments of the present invention may provide that the second perpendicular support 47 extend a greater distance forward to properly engage a wall décor 91 having a wider horizontal top edge 92 where such distance may be from about 1 inch to about 2 inches. In a preferred embodiment of the present invention the second perpendicular support 47 of the left vertical member 41 is designed and adapted to engage the horizontal top edge 92 of the wall décor 91 being coplanar and parallel to the first perpendicular support 46 of the left vertical member 41.

Continuing to refer to FIGS. 1, 2, 3, 5, 6, 7, and 8, in a preferred embodiment of the present invention the right vertical member 51 of the lower frame section 21 is contiguous to the first end 16 of the second upward extending member 15 of the upper frame section 11. The design and configuration of the right vertical member 51 is a mirror image of the left vertical member 41. The right vertical member 51 having a right lateral support 52, first and second perpendicular supports 56, 57 and a right anchor 53.

The right lateral support 52 of the right vertical member 51 being coplanar to and extending perpendicularly rightward away from the first end 16 of the second upward extending member 15 of the upper frame section 11. The right lateral support 52 of the right vertical member 51 is designed and adapted to traverse laterally along the horizontal top edge 92 of the wall décor 91 upon which the present invention is mounted for detachably attaching a length of decoration 90. Similar to the left lateral support 42 of the left vertical member 41 the length of the right lateral support 52 of the right vertical member 51 in a preferred embodiment of the present invention is about 1½ inches. However, it is anticipated that the length of the right lateral support 52 of the right vertical member 51 may range from about 1 inch to about 2 inches for wall décor of greater widths when additional support and stability is desired.

The first perpendicular support 56 of the right vertical member 51 is contiguous to the right lateral support 52 of the right vertical member 51 and designed and adapted to engage the horizontal top edge 92 of said wall décor 91. In a preferred embodiment of the present invention the first perpendicular support 56 of the right vertical member 51 extends a distance of about ½ inch perpendicularly rearward from the right lateral support 52 of the right vertical member 51. Alternative embodiments of the present invention may provide that the first perpendicular support 56 of the right vertical member 51 extend a greater distance to properly engage wall décor 91 having a wider horizontal top edge 92 where such distance may be about ⅜ inch to about ¾ inch.

The right anchor 53, generally having a shape, of the right vertical member 51 extends a distance perpendicularly downward from the first perpendicular support 56 of the right vertical member 51 comprising coplanar first and second downward extending members 54, 55 of approximate equal lengths. The lower ends of the first and second downward extending members defining the "U" shaped lower end of the right anchor 53. In a preferred embodiment of the present invention the lengths of the first and second downward extending members 54, 55 being about 5⅝ inches, however in other embodiments of the present invention the lengths of the first and second downward extending members may range from about 5 inches to about 7 inches. The first and second downward extending members 54, 55 of the right anchor 53 of the right vertical member 51 have first and second upper ends 58, 59, respectively. The first upper end 58 of the first downward extending member 54 of the right anchor 53 of the right vertical member 51 being contiguous to the first perpendicular support 56. In a preferred embodiment of the present invention the right anchor 53 of the right vertical member 51 is designed and adapted to rest against the vertical back side 94 of said wall décor 91 and to abut the wall to which the wall décor is attached to provide stability for the present invention when detachably attaching a length of decoration to the wall décor. In a preferred embodiment of the present invention the distance between the first and second downward extending members 54, 55 of the right anchor 53 of the right vertical member 51 is about 1¼ inches. However, the distance between the first and second downward extending members 54, 55 of the right anchor 53 of the right vertical member 51 may be from about 1 inch to about 2 inches or more for larger preferred embodiments of the present invention. To provide additional stability and rigidity for structural integrity to the lower section 21 of the present invention 10 an additional preferred embodiment may provide a right horizontal brace 74 horizontally connected to the first and second upper ends 58, 59 of the first and second downward extending members 54, 55 of the right anchor 53 of the right vertical member 51. The length of the right horizontal brace 74 being equal to the distance between the first and second downward extending members 54, 55 of the right anchor 53 of the right vertical member 51.

The second perpendicular support 57 of the right vertical member 51 is contiguous to, and extends a distance of about 1⅛ inch perpendicularly forward from, the second upper end 59 of the second downward extending member 55 of the right anchor 53 of the right vertical member 51. Alternative embodiments of the present invention may provide that the second perpendicular support 57 extend a greater distance forward to properly engage a wall deco 91 having a wider horizontal top edge 92 where such distance may be from about 1 inch to about 2 inches. In a preferred embodiment of the present invention the second perpendicular support 57 of the right vertical member 51 is designed and adapted to engage the horizontal top edge 92 of the wall décor 91 being coplanar and parallel to the first perpendicular support 56 of the right vertical member 51.

Referring now to FIGS. 1, 2, 3, 4A, 4B, 6, 7 and 8, a preferred embodiment of the present invention comprises first and second horizontal mounting members 31, 34 of equal lengths. The first horizontal mounting member 31 has angled stop ends 32, 33. Similarly, the second horizontal mounting member 34 has angled stop ends 35, 36. The horizontal mounting members 31, 34 are extended a distance in opposite directions parallel to the horizontal top edge 92 of the wall décor 91 for detachable attachment of the desired length of decoration 90. In typical situations the horizontal mounting members are extended a distance about equal to the width of the wall décor 91 for the detachable attachment of a length of decoration 90.

The angled stop ends 32, 33 of the first horizontal mounting member 31 being designed and adapted to slidably engage the first and second parallel eyelets 18, 19 respectively of said upper frame section 11 to limit the distance to which the first horizontal member 31 may be extended in either direction. The angled stop ends 35, 36 of the second horizontal mounting member 34 being designed and adapted to slidably engage the first and second parallel eyelets 18, 19 respectively of said upper frame section 11 to limit the distance to which the second horizontal member 34 may be extended in either direction.

A preferred length for the horizontal mounting members being about 22 inches which will generally accommodate framed and unframed artwork, mirrors, paintings, and other wall décor having widths from about 18 inches to about 40 inches. Horizontal mounting members of about 20 inches to about 22 inches will generally accommodate the most common picture frames, mirrors, and other such wall décor. In similar fashion to the scaling of size for the upper and lower frame sections 11, 21 depending on the size of the wall décor and the size and type of decoration to be mounted the lengths of the horizontal mounting members 31, 34 can be easily increased or decreased of to accommodate most commonly used wall décor widths.

The design simplicity of a preferred embodiment of the present invention is carried forward to the simplicity of the present invention's use. Now referring to FIGS. 1 to 8, to use the present invention the left and right vertical members 41, 51 of the lower frame section 21 are typically inserted behind the middle portion of the wall décor 91 and moved downward along its vertical back side 94. The downward insertion of the lower frame section 21 continues until the left lateral support 42 and the first and second perpendicular supports 46, 47 of the left vertical member 41 and the right lateral support 52 and the first and second perpendicular supports 56, 57 of the right vertical member 51 come to rest on and engage the horizontal top edge 92 of the wall décor 91. Upon completion of the placement of the present invention 10 on the wall décor 91 the horizontal mounting members 31, 34 are extended in opposite directions a distance generally sufficient to span the width of the wall décor, or a greater or lesser distance as may be required by the size, kind, or length of decoration being detachably attached to the horizontal mounting members 31, 34 and the upper frame section 11. Once the horizontal mounting members 31, 34 are extended a length of decoration can be detachably attached to the horizontal mounting members and to the upper frame section 11 with the use of zip-ties, wire ties, or other such easily used and removable means to detachably attach the length of decoration 90 to the present invention 10. When the need for the decoration of the wall décor ends, the present invention is simply lifted off the wall décor without damage to either the wall décor or the wall. Once the decoration need ends and the length of decoration may be removed from the horizontal mounting members 31, 34 and the upper frame section 11 of the present invention 10. Alternatively, once the decoration need ends the decoration may remain attached to the present invention and be stored intact until needed for a future decoration of the wall décor.

The simple design of the present invention is conducive to an economical manufacturing process for the present invention. The upper and lower frame sections 11, 21 of the present invention can be manufactured from a single length of metal wire of sufficient rigidity with appropriate bends to form the various components comprising the present invention.

Additionally, for ease and economy of manufacture the same metal wire can be used for the manufacture of the upper and lower frame sections 11, 21 and the horizontal mounting members 31, 34 so long as such metal wire has the sufficient strength and, rigidity to horizontally support the size, kind, or length of decoration typically detachably attached to the upper frame section 11 and to the horizontal mounting members 31, 34. In a preferred embodiment of the present invention ⅛ inch steel round bar is used for its manufacture. In other preferred embodiments the present invention may utilize steel round bar of greater or lesser diameters depending on the overall dimensions of the present invention with respect to the size and shape of the wall décor on which it may be used and also with respect to the size and shape of the decoration detachably attached to the present invention. Other embodiments of the present invention may be manufactured from plastic materials exclusively, or part plastic and part metal wire, of sufficient rigidity and strength as necessary to support the length of decoration detachably attached to the present invention. In a preferred embodiment of the present invention the metal wire from which the present invention is manufactured comprises a polymeric coating to prevent possible scratches or other damage to the wall décor or the wall to which the wall décor is mounted.

The preferred embodiments of the present invention provide numerous benefits for the decoration of vertically mounted wall décor. The simple design of the present invention permits its economical manufacture with regard to the materials used in its manufacture as well as its simplicity of use. Additionally, the simple design provides for the economical manufacture of the present invention in a variety of sizes to accommodate a greater variety of wall décor of various sizes and shapes. The simple design of the present invention makes its packaging and distribution more economical than other more complex products available to the public for purchase. The simplicity of use aspects of the present invention is desirable for the general marketing of the present invention to those prospective users that may not be as mechanically inclined as other users. The present invention can be used with either natural or artificial pine or artificial garland or other decorations and customized as desired by the user. Additionally, other preferred embodiments may include such pre-assembled configurations where the present invention is provided by the manufacturer for retail sale with a length of decoration already detachably attached to the device. Where the present invention is provided as a pre-assembled decorating item the user can position the item on top of a wall décor for use and then simply lift the item of the wall décor and store intact for a later use.

The present invention does not require hooks, nails, fasteners or tools for its mounting onto the horizontal top edge of the wall décor or for the attachment or removal of the decoration from the invention. The present invention will not damage wall décor or walls when attaching or removing a length of decoration. Additionally, the present invention can be used without interfering with the means by which a wall décor may utilize for its affixation to its wall.

Although preferred embodiments of the present invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention. In addition, it should be understood that aspects of the various embodiments may be interchanged either in whole, or in part. Therefore, the spirit and scope of the invention should not be limited to the description of the preferred embodiments contained herein.

What is claimed is:

1. A device for mounting a length of decoration to a wall décor comprising:
    an upper frame section generally having an inverted flattened "U" shape extending vertically a distance above said wall décor designed and adapted for the detachable attachment of said length of decoration to said upper frame section, said upper frame section having a front side and a back side and being generally coplanar to said wall décor, said wall décor including wall mounted artwork and decorating accessories having a generally horizontal top edge, a vertical front side, a vertical back side, and a width, said upper frame section comprising
        a first upward extending member having a first end and an inward perpendicular second end,
        a second upward extending member having a first end and an inward perpendicular second end, said inward perpendicular second end of said first upward extending member and said inward perpendicular second end of said second upward extending member defining a top end, and
        first and second horizontal braces attached horizontally to said first and second upward extending members, said first horizontal brace of said upper frame section attached to said first and second upward extending members at equal distances above said first ends of said first and second upward extending members, said second horizontal brace attached to said first and second upward extending members generally midway between said top end of said upper frame section and said first horizontal brace of said upper frame section,
    a lower frame section contiguous to said upper frame section being designed and adapted to engage said horizontal top edge of said wall décor and to extend a distance below said horizontal top edge and adjacent to said vertical back side of said wall décor, whereby said device is supported by said horizontal top edge of said wall décor, said lower frame section comprising
        a left vertical member contiguous to said first end of said first upward extending member of said upper frame section, said first left vertical member comprising
            a left lateral support having a length extending perpendicularly leftward away from said first end of said first upward extending member of said upper frame section, said left lateral support being coplanar to said first end of said first upward extending member of said upper frame section and traversing laterally along said horizontal top edge of said wall décor,
            a first perpendicular support contiguous and coplanar to said left lateral support of said left vertical member designed and adapted to engage the horizontal top edge of said wall décor, said first perpendicular support extending a distance perpendicularly rearward from said left lateral support,
            a left anchor generally having a "U" shape extending a distance perpendicularly downward from said first perpendicular support of said left vertical member comprising coplanar first and second downward extending members of approximate equal lengths, said first and second downward extending members having first and second upper ends said first upper end of said first downward extending member being contiguous to said first perpendicular support of said left vertical member, wherein said left anchor designed and adapted to rest against said vertical back side of said wall décor, and
            a second perpendicular support contiguous to and extending a distance perpendicularly forward from said second upper end of said second downward extending member of said left anchor of said left vertical member and being coplanar and parallel to said first perpendicular support of said left vertical member, said second perpendicular support designed and adapted to engage the horizontal top edge of said wall décor,
        a right vertical member contiguous to said first end of said second upward extending member of said upper frame section being a mirror image of said left vertical member, said right vertical member comprising
            a right lateral support having a length extending perpendicularly rightward away from said first end of said second upward extending member of said upper frame section, said right lateral support being coplanar to said first end of said second upward extending member of said upper frame section and traversing laterally along said horizontal top edge of said wall décor,
            a first perpendicular support contiguous and coplanar to said right lateral support of said right vertical member designed and adapted to engage the horizontal top edge of said wall décor, said first perpendicular support of said right vertical member extending a distance perpendicularly rearward from said right lateral support of said right vertical member,
            a right anchor generally having a "U" shape extending a distance perpendicularly downward from said first perpendicular support of said right vertical member comprising coplanar first and second downward extending members of approximate equal lengths, said first and second downward extending members having first and second upper ends said first upper end of said first downward extending member being contiguous to said first perpendicular support, wherein said right anchor of said right vertical member designed and adapted to rest against said vertical back side of said wall décor, and a second perpendicular support contiguous to and extending a distance perpendicularly forward from said second upper end of said second downward extending member of said right anchor of said right vertical member and being coplanar and parallel to said first perpendicular support of said right vertical member, said second perpendicular support designed and adapted to engage the horizontal top edge of said wall décor, first and second horizontal mounting members having equal lengths designed and adapted to slidably engage said upper frame section, said first horizontal mounting member having first and second angled stop ends and said second horizontal mounting member having first and second angled stop ends, wherein said first and second horizontal mounting members extending a distance in opposite directions parallel to said horizontal top edge of said wall décor for detachable attachment of said length of decoration, and first and second parallel eyelets through which said first and second horizontal mounting members slidably extend being designed and adapted to engage said angled stop ends of said first and second horizontal mounting members, said parallel eyelets being attached to the front side of the upper frame section at a distance above said first ends of said first and second upward extending members of said upper frame section.

2. The device for mounting a length of decoration of claim 1, wherein said distance which said upper frame section extends above said wall décor is about 5 inches to about 7 inches.

3. The device for mounting a length of decoration of claim 2, wherein said distance which said upper frame section extends above said wall décor is about 5½ inches.

4. The device for mounting a length of decoration of claim 1, wherein said upper frame section comprising a width of about 2¾ inches to about 4 inches.

5. The device for mounting a length of decoration of claim 4, wherein said upper frame section comprising a width of about 3 inches.

6. The device for mounting a length of decoration of claim 1, wherein said first and second upward extending members of said upper frame section having equal lengths of about 5 inches to about 7 inches.

7. The device for mounting a length of decoration of claim 6, wherein said first and second upward extending members of said upper frame section having equal lengths of about 5½ inches.

8. The device for mounting a length of decoration of claim 1, wherein said distance which said lower frame section extends below said horizontal top edge of said wall décor is about 5 inches to about 7 inches.

9. The device for mounting a length of decoration of claim 8, wherein said distance which said lower frame section extends below said horizontal top edge of said wall décor is about 5¾ inches.

10. The device for mounting a length of decoration of claim 1, wherein said left lateral support of said left vertical member of said lower frame section and said right lateral support of said right vertical member of said lower frame section having equals lengths of about 1 inch to about 2 inches.

11. The device for mounting a length of decoration of claim 10, wherein said left lateral support of said left vertical member of said lower frame section and said right lateral support of said right vertical member of said lower frame section having equals lengths of about 1½ inch.

12. The device for mounting a length of decoration of claim 1, wherein said first perpendicular support of said left vertical member of said lower frame section and said first perpendicular support of said right vertical member of said lower frame section extending equal distances of about ⅜ inch to about ¾ inch.

13. The device for mounting a length of decoration of claim 12, wherein said first perpendicular support of said left vertical member of said lower frame section and said first perpendicular support of said right vertical member of said lower frame section extending equal distances of about ½ inch.

14. The device for mounting a length of decoration of claim 1, wherein said first and second downward extending members of said left anchor of said left vertical member of said lower frame section and said first and second downward extending members of said right anchor of said right vertical member of said lower frame section having equal lengths of about 5 inches to about 7 inches.

15. The device for mounting a length of decoration of claim 14, wherein said first and second downward extending members of said left anchor of said left vertical member of said lower frame section and said first and second downward extending members of said right anchor of said right vertical member of said lower frame section having equal lengths of about 5¾ inches.

16. The device for mounting a length of decoration of claim 1, wherein said second perpendicular support of said left vertical member of said lower frame section and said second perpendicular support of said right vertical member of said lower frame section extending equal distances of about 1 inch to about 2 inches.

17. The device for mounting a length of decoration of claim 16, wherein said second perpendicular support of said left vertical member of said lower frame section and said second perpendicular support of said right vertical member of said lower frame section extending equal distances of about 1⅛ inches.

18. The device for mounting a length of decoration of claim 1, wherein said length of each of said first and second horizontal mounting members being about 20 inches to about 22 inches.

19. The device for mounting a length of decoration of claim 18, wherein said first and second horizontal mounting members each having a length of about 22 inches.

20. The device for mounting a length of decoration of claim 1, wherein said first and second parallel eyelets each having a diameter of about ⅜ inch to about ⅝ inch.

* * * * *